United States Patent [19]

Stafford

[11] 4,135,598
[45] Jan. 23, 1979

[54] LIFT AND ISOLATION SYSTEM FOR SEISMIC VIBRATOR

[75] Inventor: Jay H. Stafford, Ponca City, Okla.

[73] Assignee: Continental Oil Company, Ponca City, Okla.

[21] Appl. No.: 848,225

[22] Filed: Nov. 3, 1977

[51] Int. Cl.² .............................................. G01V 1/14
[52] U.S. Cl. .................................... 181/114; 181/401;
    73/666; 248/559; 248/624
[58] Field of Search ............... 181/113, 114, 119, 121,
    181/401; 340/15.5 SW, 17; 73/666; 214/450;
    248/10, 20

[56] References Cited

U.S. PATENT DOCUMENTS

| | | | |
|---|---|---|---|
| 3,159,232 | 12/1964 | Fair | 181/401 |
| 3,205,971 | 9/1965 | Clynch | 340/15.5 SW |
| 3,306,391 | 2/1967 | Bays | 181/114 |
| 3,353,772 | 11/1967 | Fair et al. | 181/121 |
| 3,716,111 | 2/1973 | Lavergne | 181/401 |
| 3,777,843 | 12/1973 | Fair et al. | 181/114 |
| 3,811,530 | 5/1974 | Johnston | 181/114 |
| 3,983,957 | 10/1976 | Silverman | 340/17 R |
| 4,014,533 | 3/1977 | Krescir et al. | 248/20 |

Primary Examiner—Nelson Moskowitz
Attorney, Agent, or Firm—William J. Miller

[57] ABSTRACT

Apparatus for truck-mounting of vibrational seismic energy transducers, particularly shear wave transducers, that provides improved vibrational damping and energy coupling into the earth. The apparatus consists of a four column, hydraulically actuatable suspension system operative from the truck or carrier frame as opposite side pairs to support a box frame under which the vibrator and earth coupling assembly is supported by a system of lateral and vertical springs. The vibrator assembly is entirely supported by means of left and right transverse springs to transmit reactive forces resulting from isolation through the box weldment and four columns to the vehicle body. Thus, the vibrator and its associated base plate structure is entirely supported from the vehicle and positioning assembly by resilient means having the requisite interactive constants.

10 Claims, 5 Drawing Figures

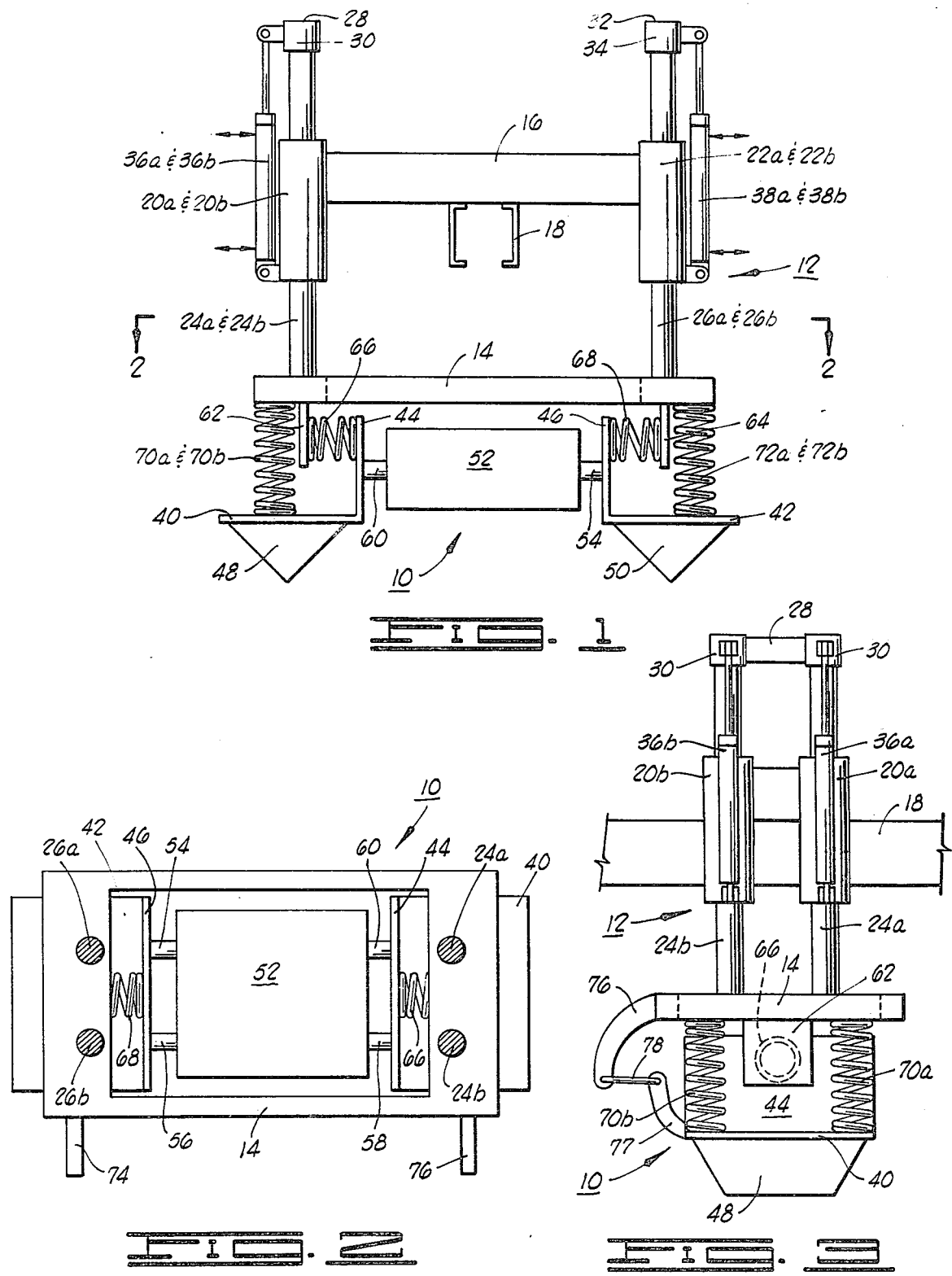

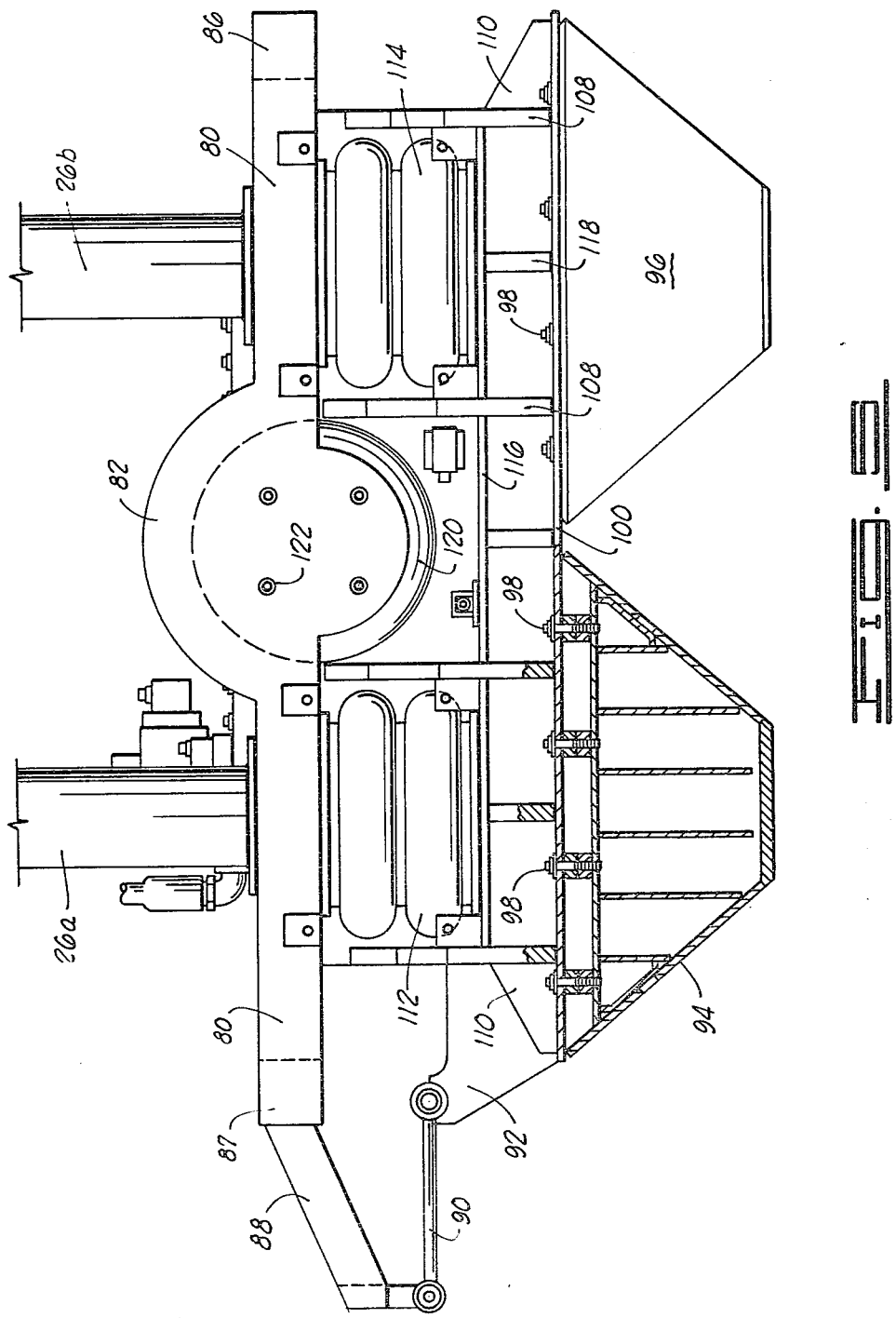

LIFT AND ISOLATION SYSTEM FOR SEISMIC VIBRATOR

BACKGROUND OF THE INVENTION

1. Field of the Invention

The invention relates generally to seismic energy vibrator carriers and support systems and, more particularly, but not by way of limitation, it relates to an improved truck-mounted shear wave vibrational seismic energy transducer.

2. Description of the Prior Art

The prior art includes several types of carrier mounting configurations which provide seismic energy coupling to the earth's surface with requisite high efficiency. The prior carrier-mounted vibrators of the shear wave transducer type are particularly characterized in the prior art by U.S. Pat. Nos. 3,205,971; 3,353,772; 3,372,770; and 3,690,402. The U.S. Pat. No. 3,205,971 deals with a prior apparatus wherein vertical air springs and lateral coil springs were utilized to couple a shear wave vibrator, as directly supported, to opposite-side support columns operative to suspend the vibrator assembly beneath a carrier. Yet another form of suspension apparatus is illustrated in U.S. Pat. No. 3,353,772 wherein a shear wave vibrator is suspended from a carrier with vertical columns supporting over the vibrator base plate by means of vertical air bags, and adjustable tension leaf springs having slide-guide contact with the vibrator assembly are utilized to provide lateral stabilization. The extremely high lateral spring tension required in this scheme resulted in reduced isolation of the base plate lateral motion relative to the carrier vehicle. This stabilization problem was overcome to some degree utilizing a hydraulically-actuated lateral cleating arrangement as taught by the U.S. Pat. No. 3,372,770; and, still other attempts at adequate vibration isolation versus assembly stability were made with apparatus as taught in U.S. Pat. No. 3,690,402. It should be apparent from an inspection of these teachings that they are diverse in approach and, while each could be attributed certain attributes, there were attendant drawbacks which impose specific limitations of usage as were to be overcome by such as the present invention.

SUMMARY OF THE INVENTION

An apparatus for carrier suspension of a seismic energy vibrator, particularly a shear wave vibrator, wherein plural support columns are utilized on each side of the carrier vehicle to support the seismic energy transducer totally beneath a box frame that is rigidly connected to the main frame of the carrier vehicle. The transducer or shear wave seismic energy vibrator is resiliently supported beneath the box frame, having both lateral and vertical spring connection thereto, with energy-coupling base plates and frame components rigidly connected to the vibrator assembly.

Therefore, it is an object of the present invention to provide a carrier-mounted seismic energy transducer that is extremely stable in operating position and relatively free from interactive vibrational effects during operation.

It is also an object of the present invention to provide a carrier-mounted shear wave vibrator assembly that is extremely stable in both transverse and longitudinal directions when earth coupled and in operation.

It is yet another object of the present invention to provide a shear wave vibrator that is coupled to an associated vehicle carrier only through vertical and lateral resilient connections so that most effective vibration isolation is achieved relative to the carrier.

Finally, it is an object of this invention to provide a carrier-mounted shear wave vibrator that is supported on each side under predetermined spring tension, both vertical and horizontal, such tension being adjustable so that the unit may provide optimum energy-coupling regardless of terrain.

Other objects and advantages of the invention will be evident from the following detailed description when read in conjunction with the accompanying drawings which illustrate the invention.

BRIEF DESCRIPTION OF THE DRAWINGS

FIG. 1 is a rear view elevation of the lift and isolation apparatus as shown in generally schematic form;

FIG. 2 is a section taken along lines 2—2 of FIG. 1;

FIG. 3 is a side elevation of the apparatus of FIG. 1;

FIG. 5 is a side view in elevation of the apparatus of FIG. 4.

DETAILED DESCRIPTION OF THE INVENTION

Figure 4:
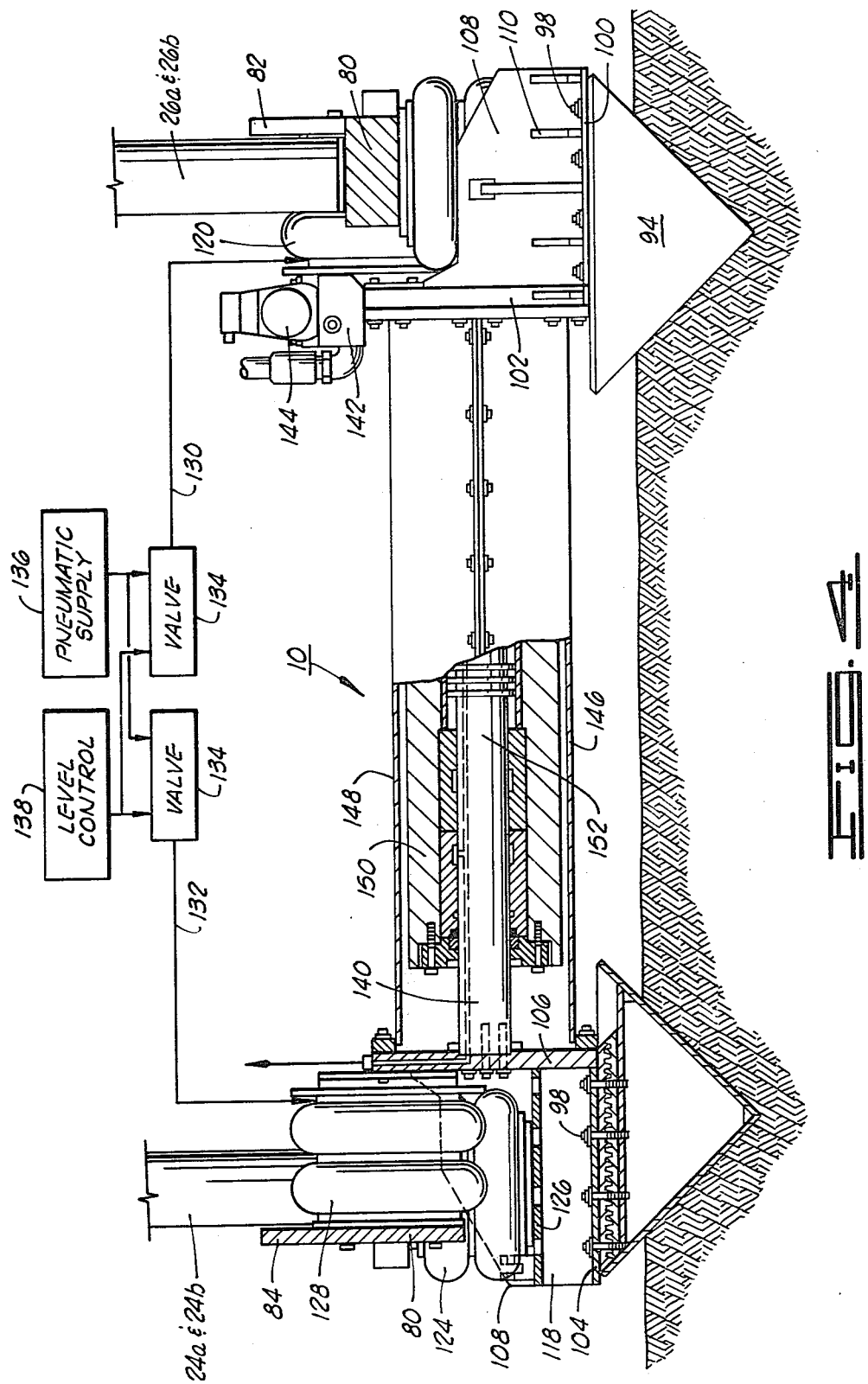
FIG. 4 is a front view in elevation of a particular shear wave transducer apparatus utilizing the lift and isolation apparatus of the invention, and with parts shown in cutaway section and control elements shown in block diagram.

Referring to FIG. 1, a shear wave vibrator apparatus 10 is operatively held beneath a lift and isolation apparatus 12 which includes a transverse box frame 14 and an upper support frame 16 which is rigidly secured to a main frame member 18 of the carrier or associated truck vehicle (not shown). Vehicle mounting of seismic energy vibrators is well-known in the art and such teaching is particularly characterized by the U.S. Pat. No. 3,306,391 in the name of Bays entitled "Portable Seismic Transducer." While frame member 18 is characterized as being a unitary or central frame member, it should also be understood that such vehicle frame support may be parallel lateral framing or other well-known forms of vehicle chassis structure.

The lateral support frame 16 is necessarily of rugged construction and well secured to frame or frame members 18 to support the lift and isolation apparatus 12 and the transducer apparatus 10. Thus, four parallel-aligned journal sleeves 20a, 20b and 22a, 22b (see FIG. 3), two on each side, are welded on the lateral ends of support frame 16. Each of the four-cornered journal sleeves then support respective parallel-aligned polished columns 24a and 24b, and 26a and 26b, which extend downward into secure affixure to the transverse box frame 14. The upper end of each of the polished columns 24a and 24b is secured and maintained parallel by means of a crossbeam 28 having end caps 30 for receiving the column ends therein securely (see FIG. 3); and in like manner, the opposite polished columns 26a and 26b have secured at their top end a cross beam 32 by means of end caps 34. Conventional hydraulic assemblies of suitable size and stroke then provide controlled movement of the polished columns relative to their respective journal sleeves, i.e., hydraulic pistons 36a and 36b control vertical movement of columns 24a and 24b while hydraulic pistons 38a and 38b control positioning of columns 26a and 26b. Referring also to FIG.

2, each of the columns 24a and 24b and 26a and 26b extend downward for secure affixture to a box weldment or frame 14 which then serves to support vibrator assembly 10 resiliently therebeneath. The vibrator assembly 10 includes opposite side, generally rectangular base plate members 40 and 42 each having an upright base plate portion 44 and 46, respectively. Each of the base portions of base plate 40 and 42 has an earth-coupling cleat assembly 48 and 50 respectively, secured thereto. A vibrator reaction mass 52 is then secured in transverse position as piston rod ends 54 and 56 are rigidly secured to the inner face of upright base plate portion 46 while opposite piston rod ends 58 and 60 are similarly connected to the opposite side base plate portion 44.

The vibrator assembly 10 is suspended beneath the box weldment or rectangular frame 14 in resilient vibration damping manner by vertical and horizontal spring members. Opposite side vertical plates 62 and 64 are securely welded in alignment with respective columns 24a and 24b and 26a and 26b on the underside of frame 14. Horizontal spring members 66 and 68 are then secured between vertical plates 62 and 64 and their respective base plate upright portions 44 and 46. A pair of vertical spring members 70a and 70b, and 72a and 72b are then affixed to support between respective side portions of box frame 14 and base plates 40 and 42. While the spring members are illustrated schematically as being coil-type, it should be understood that more sophisticated spring members enabling controllable spring tension are preferred, as will be further described below.

A pair of tie bars 76 and 74 (FIG. 2) are secured as by welding to the box frame 14 to extend forward and downward on each side thereof. Additional tie bars 77 are then secured to the forward edge of respective base plates 40 and 42 to extend upward into position for receiving a radius rod 78 which serves to secure each side of vibrator assembly 10 in limited manner to box frame 14. Thus, the radius rods 78 are positioned parallel to the axis of the carrier vehicle and serve to maintain longitudinal stability during operation while still allowing the requisite vertical and lateral base plate motion.

In operation, the vibrator assembly 10, in this case a dual piston shear wave vibrator with reaction mass 52, is coupled into energy transducing relationship by hydraulically raising the vehicle, i.e., frame 18 and attendant vehicle structure, to bear on the columns 24a and 24b, and 26a and 26b thereby forcing earth-coupling cleat members 48 and 50 into the ground. In the event of uneven terrain, spring tension of the horizontal spring members 66 and 68 may be adjusted, as will be further described. Thereafter, the vibrator assembly 10 can be operated to carry out its sequence of seismic energy shots, and maximum energy into the earth is realized by most effective damping of reactive forces that may dissipate through the support and carrier structure. Thus, the vertical springs 70a, b and 72a, b working in conjunction with respective horizontal spring members 66 and 68 serve effectively to isolate the vibrator forces as the reactive forces resulting from the isolation are transmitted through the box frame 14 and the support columns 24a, b and 26a, b to the vehicle.

A particular design construction utilizing the above-described isolation design is shown in FIGS. 4 and 5. As shown in FIGS. 4 and 5, the vibrator 10 is supported in conventional manner beneath a truck carrier or the like by means of opposite side pairs of vertical columns 24a, b and 26a, b. On one side, the vertical guide columns 26 extend down into rigid affixure as by welding to a box frame 80 having a semi-circular center portion 82 formed therein for receiving lateral spring support structure, as will be described. The opposite side of box frame 80 is similarly formed with a semi-circular portion 84. Thus, the opposite side guide columns 24a and 24b also extend down for rigid affixure to the opposite side of box frame 80. Box frame 80 extends completely around the vibrator unit 10 in generally rectangular shape as opposite-side frame bars extend around the rear of the configuration by a continuous bar 86, and across the front by a continuous steel bar 87. Tie bars 88 are then weld-affixed to bar 87 and serve to support pivotally connected radius rods 90 as affixed to bracket members 92 to provide longitudinal stabilization during operation.

Each side of the vibrator 10 is coupled to the earth by means of a pair of inverted, generally pyramidal, cleat members 94 and 96 thus, the cleat members 94 and 96 are secured by a plurality of bolts 98 to a base place member 100 which is secured as by welding to an upright portion or end plate 102. Opposite side cleat members 94 and 96 are similarly secured to a base plate 104 having upright end plate 106. The base plate/end frame structure is reinforced in all directions by means of a plurality of transverse angle brackets or gusset plates 108 as weld-affixed in support, and also a plurality of gusseting angle plates 110 welded across the front and rear edges of respective base plates 100 and 104.

The vibrator 10 is actually supported from the end plates 102 and 106 as rigidly secured to their respective cleat members, and vibration damping coupling is provided with respect to the upper support columns 24 and 26. Thus, and referring particularly to FIG. 5, vertical support is provided by air springs 112 and 114 as secured beneath the under side of box frame bar 80 and a support plate 116 which is welded in parallel alignment over base plate 100 and supported by a plurality of parallel, weldaffixed insert plates 118. The upper and lower portions of air springs 112 and 114 are secured to their respective receiving surfaces by means of bolts (not shown) in conventional manner. The particular air springs 112 and 114 that are utilized are known as the double diaphragm type, a well-known type that is commercially available from the Industrial Rubber Products Division of Firestone Rubber Company, Noblesville, Indiana.

Lateral resilient support is then afforded by a horizontal air spring 120 as it is secured between a central arcuate portion 82 of box frame 80 by the conventional affixure with bolts 122, and the remaining or inward end in affixed to the outer surface of end plate 102 thereby completing the two dimensions of vibrationally damped suspension. The opposite end of vibrator 10 is supported in an identical manner with a pair of vertical air springs 124 as affixed between box frame bar 80 and a support plate 126, and lateral suspension is provided by means of an air spring 128 secured between the box frame circular portion 84 and the end plate 106.

The horizontal or lateral air springs 120 and 128 are also a commercially available type, rolling diaphragm air springs, a model which will allow air pressure adjustment to control spring tension. Thus, each of air springs 120 and 128 are connected by means of air lines 130 and 132 to an individual control valve 134, each in communication with a pneumatic supply 136. Level control is exercised by suitable level control switching 138 to actuate control valve 134 thereby to vary the amount of air pressure in each of air springs 120 and 128. Such control allows variation in the air pressure in the horizontal air springs 120 and 128 thereby to keep the vibrator centered under the carrier vehicle regardless of weight shifts caused by uneven terrain and the like.

As shown in FIG. 4, the rod ends, e.g., rod end 140, is attached to the respective end plates 106 and 102 by a plurality of suitable screws (not shown) extending through the end plates in affixure in appropriately threaded bores in the respective rod ends. Conventional O-ring seal means are then utilized between the rod ends and their respective end plates in order to provide the requisite fluid-type pressure seal. A manifold 142 and conventional form of servo valve 144 are mounted on the top of end plate 102 in communication with the porting orifices formed therein for communication with the piston rod ends. Upper and lower cover panels 146 and 148 may be provided to cover the reaction mass of vibrator 10 as they are both affixed to the end plates 102 and 106, thus providing still further transverse frame structure.

The vibrator 10, as shown particularly in FIG. 4, is a hydraulically reciprocated reaction mass 150 as driven by a pair of parallel-aligned hydraulic piston rods 152. Particular structure as to the reaction mass/drive assembly of vibrator 10 is the subject matter of the copending U.S. patent application Ser. No. 848,224, filed Nov. 3, 1977 and entitled "Seismic Transducer Construction" by Delbert W. Fair, inventor.

The foregoing discloses novel seismic transducer lift and isolation structure for use in combination with the carrier vehicle. The particular form of carrier structure, including a plurality of parallel support columns and particular spring member support structure, enables increased stability, particularly as utilized in generation of shear wave energy for input into the earth. Lateral stability of the vibrator assembly, during operation, is achieved without the need for applying undue lateral spring tension, a condition which in the past has reduced the degree of isolation afforded during vibrator operation.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Lift and isolation apparatus for a carrier frame supported seismic energy transducer, comprising:
   first and second support column means having top and bottom ends and being vertically disposed on each side of said frame;
   means securing each of said support column means to said carrier frame and including hydraulic means for raising and lowering the support column means relative to said carrier frame;
   box frame means having a top surface and a bottom surface and transversely disposed under said frame and said first and second support column means, the top surface of said box frame means being rigidly secured to said bottom ends of said support column means;
   first and second baseplate means disposed generally below respective first and second support column means under the bottom surface of said box frame means and being rigidly secured to support said seismic energy transducer therebetween; and
   first and second spring means providing resilient connection, respectively of both horizontal and vertical forces, of said first baseplate means to the bottom surface of said box frame means, and said second baseplate means to the bottom surface of said box frame means.

2. Apparatus as set forth in claim 1 wherein said first and second support column means each comprises:
   at least two parallel columns; and
   cross-bar means rigidly secured between the top ends of said at least two parallel columns.

3. Apparatus as set forth in claim 2 wherein said means securing comprises:
   plural journal sleeve members each supporting one of said columns, and plural hydraulic cylinders operative between a column and respective journal sleeve member to control relative positioning.

4. Apparatus as set forth in claim 1 wherein each of said first and second spring means comprises:
   vertical spring means connected between the baseplate means and the bottom surface of said box frame means; and
   horizontal spring means connected between the baseplate means and the bottom surface of said box frame means.

5. Apparatus as set forth in claim 4 wherein each such vertical spring means comprises:
   first and second air springs disposed transversely of said carrier frame and secured on opposite side of said vertical spring means.

6. Apparatus as set forth in claim 5 wherein:
   each of said horizontal spring means is a rolling diaphragm air spring.

7. Apparatus as set forth in claim 4 wherein:
   said horizontal spring means is adjustable as to spring tension.

8. Apparatus as set forth in claim 6 wherein:
   said horizontal spring means is adjustable as to spring tension.

9. Apparatus as set forth in claim 1 wherein said first and second baseplate means each comprises:
   a base plate having an end plate rigidly secured perpendicularly thereto, said end plate being secured to support a respective side of said seismic energy transducer; and
   ground engaging structure secured to the baseplate to provide earth coupling of generated seismic energy.

10. Apparatus as set forth in claim 4 wherein said first and second baseplate means each comprises:
    a baseplate having an end plate rigidly secured perpendicularly thereto, said end plate being secured to support a respective side of said seismic energy transducer; and
    ground engaging structure secured to the baseplate to provide earth coupling of generated seismic energy.

* * * * *